United States Patent [19]
Gregory

[11] Patent Number: 5,520,429
[45] Date of Patent: May 28, 1996

[54] SHOVEL FOR DIGGING NARROW TRENCHES

[76] Inventor: Charles A. Gregory, 5008 Aurora Dr., Kensington, Md. 20895-1203

[21] Appl. No.: 504,104

[22] Filed: Jul. 19, 1995

[51] Int. Cl.⁶ ........................................ A01B 1/02
[52] U.S. Cl. ............. 294/49; 254/131.5; 294/60
[58] Field of Search .............. 294/49, 50.6, 51, 294/55, 55.5, 57, 59, 60; 172/13, 19, 371; 254/131.5

[56] References Cited

U.S. PATENT DOCUMENTS

| | | |
|---|---|---|
| 357,970 | 2/1887 | Tousley . |
| 884,416 | 4/1908 | Poindexter ........................... 294/49 X |
| 1,027,345 | 5/1912 | Lapin ........................................ 294/49 |
| 1,278,680 | 9/1918 | Klaffert ............................ 294/50.6 X |
| 1,411,166 | 3/1922 | Currier ..................................... 294/49 |
| 1,635,308 | 7/1927 | Botsford .................................. 294/49 |
| 1,908,735 | 5/1933 | Donaldson ........................... 294/49 X |
| 3,782,770 | 1/1974 | Lee .......................................... 294/49 |
| 4,718,708 | 1/1988 | Zacuto . |
| 4,904,011 | 2/1990 | Hawk . |
| 4,916,984 | 4/1990 | Albert . |

OTHER PUBLICATIONS

Ames Full Line Catalog, Catalog No. 950525; pp. 9, 11, 17, 19, and 21; 1995.

Primary Examiner—Johnny D. Cherry

[57] ABSTRACT

A shovel for digging narrow trenches, comprising a handle and a head, the head having at an upper end thereof a shank by which the head is secured to the handle and at a lower end thereof a blade which is slender and elongated and of generally U-shaped cross-sectional configuration. The blade is comprised by a bottom wall and side walls upstanding from the bottom wall. The side walls flare outwardly in the direction of the shank to form wings on opposite sides of the blade. The wings have bent-over portions serving as footrests for pressing the blade into the ground to dig a trench. The wings are so disposed as to bear on shoulders of a trench to serve as fulcra such that when the handle is depressed, the shovel will swing vertically about these fulcra and the blade will be raised. The blade is forwardly concave in a digging direction in a plane perpendicular to its cross section.

3 Claims, 1 Drawing Sheet

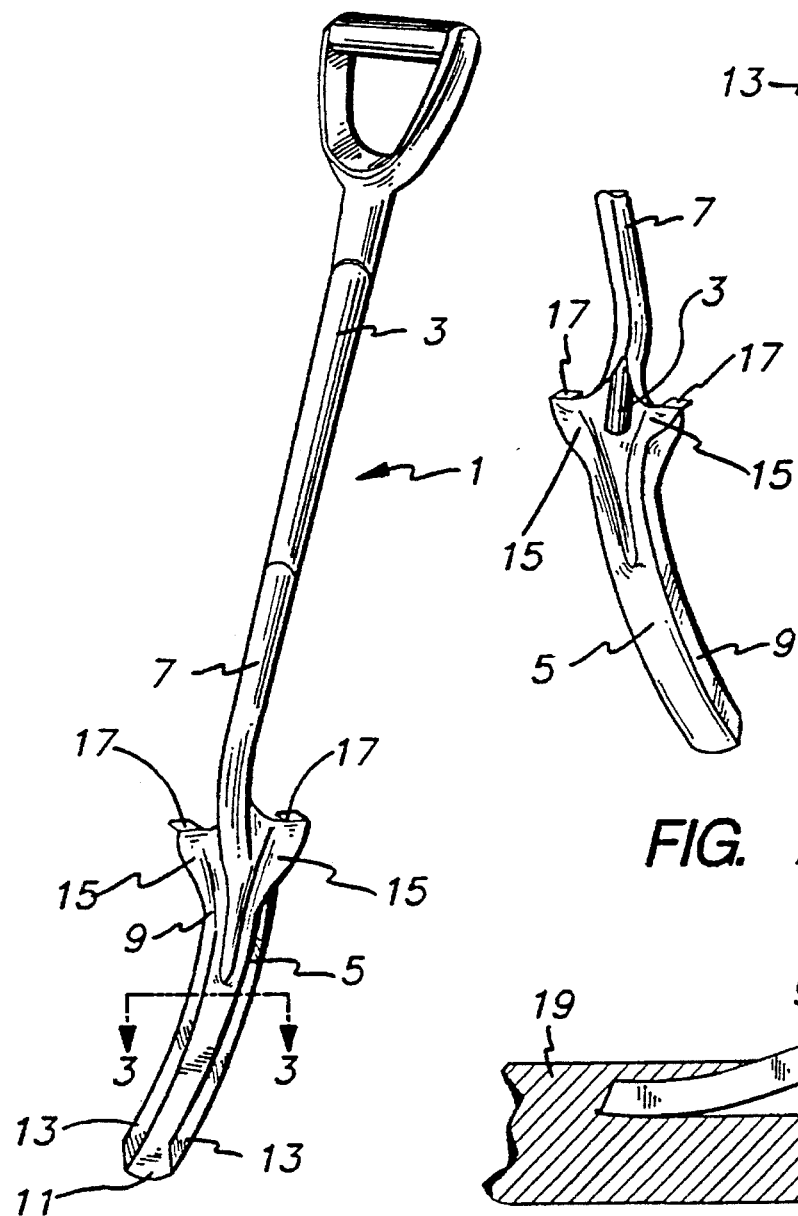
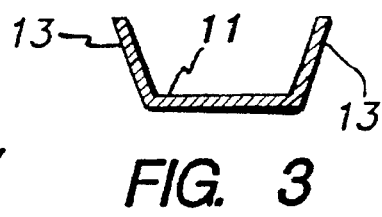
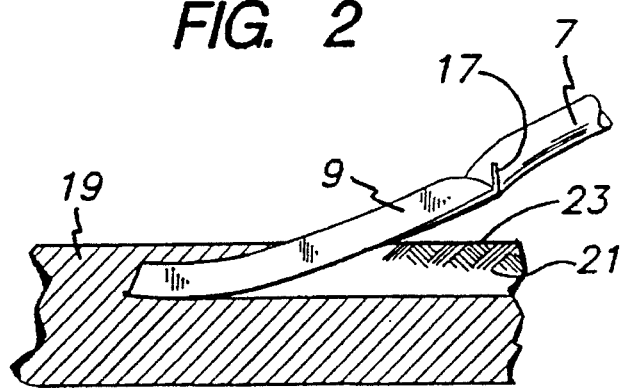
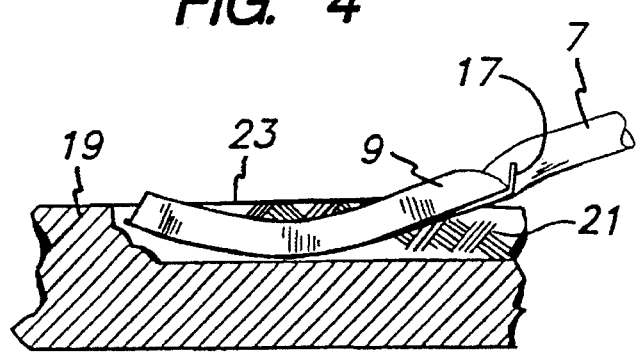

SHOVEL FOR DIGGING NARROW TRENCHES

BACKGROUND OF THE INVENTION

The present invention relates to a shovel for digging narrow trenches such as those in which gas, plumbing or electric lines are laid.

Such a shovel, as exemplified for example in U.S. Pat. Nos. 357,970, 4,718,708, 4,904,011, and 4,916,984, has an elongated narrow blade of generally U-shaped configuration, and is pressed forward with its tip underground, to dig a narrow trench of corresponding width. Such a trench can be dug to various depths, depending on how many passes of the shovel are made; but the narrow width of the trench will ordinarily be maintained, not only because a wider trench is not needed, but also because it is less work to dig and fill in the trench, the narrower is the trench.

OBJECTS OF THE INVENTION

It is an object of the invention to provide a shovel for digging narrow trenches, in which digging force can be more easily applied to the shovel.

Another object of the invention is to provide such a shovel, with which loosening of the soil is facilitated.

Finally, it is an object of the present invention to provide such a shovel, which will be relatively simple and inexpensive to manufacture, easy to manipulate and rugged and durable in use.

SUMMARY OF THE INVENTION

These objects are achieved according to the present invention, by providing a shovel as described above, in which oppositely extending wings are provided at the upper end of the shovel head. These wings are bent over to provide footrests on either side of the shovel, against which the foot of the user can bear, in order to press the shovel forward into the soil to dig a trench. The shovel can also be raised to loosen the dirt in the trench, by depressing the handle, whereupon the wings come to bear on the shoulders of the trench, thereby to provide a fulcrum about which the shovel can be swung, by pushing the handle downward in order to cause the free end of the shovel to move upward.

BRIEF DESCRIPTION OF THE DRAWING

These and other features and advantages of the present invention will become apparent from a consideration of the following description, taken with the accompanying drawing, in which:

FIG. 1 is a perspective view of a shovel according to the present invention;

FIG. 2 is a perspective view of a shovel head from the side opposite that shown in FIG. 1;

FIG. 3 is an enlarged cross-sectional view on the line 3—3 of FIG. 1;

FIG. 4 is a side elevational view of the shovel head in one position of use; and FIG. 5 is a side elevational view of the shovel head in another position of use.

DETAILED DESCRIPTION OF THE INVENTION

Referring now to the drawing in greater detail, there is shown a shovel for digging narrow trenches, according to the present invention, indicated generally at 1, comprising a handle 3 of conventional configuration and a head 5 of novel configuration. Head 5 is comprised by a conventional shank 7 which surrounds handle 3 and by which head 5 is secured to handle 3, and a novel blade 9, blade 9 being of generally U-shaped cross section and comprising a bottom 11 and side walls 13 upstanding from bottom 11, the side walls 13 diverging slightly from each other to facilitate freeing dirt from within the confines of blade 9.

Blade 9 is forwardly or upwardly concave, so as to facilitate digging a horizontal trench without needing to incline handle 3 horizontally, as seen in FIG. 4. In other words, the handle 3 can be positioned at an elevation convenient to the user, at the same time that the forward end of blade 9 is horizontal, thereby to facilitate digging a trench with a horizontal bottom wall.

At the upper or rear end of blade 9, the side walls 13 flare outwardly to form wings 15 which terminate upwardly at their rear edges in bent over portions providing footrests 17 against which the foot of the user can press, on either side of the shovel. Wings 15 have a length along head 5 which is less than half the length of the rest of blade 9.

In use, the shovel is pushed forwardly with the tip of blade 9 a short distance underground and in a horizontal orientation, the user pressing on one or the other of the footrests 17 with his foot in order to effect the operation of forcing the blade 9 forward thereby to cut in the ground 19 a horizontal trench 21 which will be suitably narrow thanks to the narrow configuration of at least the forward portions of blade 9.

To assist in freeing the soil in the trench, and to improve the efficacy of digging, the handle 3 can be depressed from time to time, which brings the wings 15 into contact with the shoulders 23 of trench 21 on either side thereof. The wings 15 thus serve as fulcra, about which the shovel can be swung vertically, from the FIG. 4 position to the FIG. 5 position and beyond the FIG. 5 position to raise the forward or free end of blade 9 even farther than is illustrated in FIG. 5.

This operation of swinging the shovel vertically is particularly useful, if the trench to be dug is of a depth greater than, say, that shown in FIGS. 4 and 5, that is, if the trench is dug by multiple horizontal passes of the head 5, each pass cutting to a progressively greater depth. It will be understood that, as the trench deepens, the wings 15 come into bearing contact with the shoulders 23 of trench 21 progressively sooner, that is, with progressively less downward swinging movement of handle 3. This progressively changing relationship of the shovel and the ground, the deeper the trench becomes, provides increasingly effective fulcrum action for the wings 15, as they come into bearing contact with shoulders 23 of trench 21 at a progressively greater elevation of handle 3. In other words, the deeper the trench becomes, the greater will be the underground vertical swinging movement of the forward end of blade 9, thanks to the progressively greater angle between handle 3 and ground 19 at which wings 15 first contact shoulders 23 of trench 21.

Thus, the wings 15 perform the unique dual function, not only of providing the material for footrests 17 and the channeling of the forces imposed by the foot, to the narrower forward portions of the blade 9, but also of providing fulcra for the very useful vertical swinging movement of the shovel to assist in the digging operation.

Of course, handle 3 can be wooden or plastic, as is conventional, head 5 being, as is conventional, forged, stamped or otherwise bent from sheet steel.

In view of the foregoing disclosure, therefore, it will be evident that all of the initially recited objects of the present invention have been achieved.

Although the present invention has been described and illustrated in connection with a preferred embodiment, it is of course to be understood that modifications and variations may be resorted to without departing from the scope of the present invention, as those skilled in this art will readily understand. Such modifications and variations are considered to be within the purview of the present invention as defined by the appended claims.

I claim:

1. A shovel for digging narrow trenches, comprising a handle and a head, the head having at an upper end thereof a shank by which the head is secured to the handle and at a lower end thereof a blade which is slender and elongated and of generally U-shaped cross-sectional configuration comprised by a bottom wall and side walls upstanding from the bottom wall, said side walls flaring outwardly in the direction of said shank to form wings on opposite sides of the blade, said wings having bent-over portions serving as footrests for pressing the blade into the ground to dig a said trench, said wings being so disposed as to bear on shoulders of a said trench to serve as fulcra such that when said handle is depressed, the shovel will swing vertically about said fulcra and the blade will be raised.

2. A shovel as claimed in claim 1, wherein said blade is forwardly concave in a digging direction in a plane perpendicular to said cross section.

3. A shovel as claimed in claim 1, said wings having a length that is no more than one half the length of the rest of said blade.

* * * * *